United States Patent
Heitzler et al.

(10) Patent No.: US 9,435,570 B2
(45) Date of Patent: Sep. 6, 2016

(54) MAGNETOCALORIC THERMAL APPLIANCE

(75) Inventors: Jean-Claude Heitzler, Horbourg-Wihr (FR); Christian Muller, Strasbourg (FR)

(73) Assignee: COOLTECH APPLICATIONS S.A.S., Holtzheim (FR)

( * ) Notice: Subject to any disclaimer, the term of this patent is extended or adjusted under 35 U.S.C. 154(b) by 1187 days.

(21) Appl. No.: 12/857,011

(22) Filed: Aug. 16, 2010

(65) Prior Publication Data

US 2012/0036868 A1 Feb. 16, 2012

(51) Int. Cl.
*F25B 21/00* (2006.01)

(52) U.S. Cl.
CPC ........ *F25B 21/00* (2013.01); *F25B 2321/0021* (2013.01); *F25B 2321/0023* (2013.01); *Y02B 30/66* (2013.01)

(58) Field of Classification Search
CPC ............ F25B 21/00; F25B 2321/0021; F25B 2321/0023; F25B 21/02; F25B 21/04
USPC ...................................... 62/3.1, 3.2
See application file for complete search history.

(56) References Cited

U.S. PATENT DOCUMENTS

| 8,209,988 B2* | 7/2012 | Zhang et al. ............... 62/3.1 |
| 2007/0125095 A1* | 6/2007 | Iwasaki ................ F25B 21/00 62/3.1 |
| 2008/0223853 A1* | 9/2008 | Muller ................... F25B 21/00 219/672 |
| 2012/0060512 A1* | 3/2012 | Vetrovec ..................... 62/3.1 |

FOREIGN PATENT DOCUMENTS

WO     WO 03016794 A1 * 2/2003
WO     WO 2008122535 A1 * 10/2008

* cited by examiner

*Primary Examiner* — Frantz Jules
*Assistant Examiner* — Brian King
(74) *Attorney, Agent, or Firm* — Davis & Bujold PLLC; Michael J. Bujold

(57) ABSTRACT

A magnetocaloric thermal appliance (10) comprising at least one thermal module (2) with at least one magnetocaloric element (3) in contact with a heat transfer fluid and at least one magnetic arrangement (4) arranged so as to create a magnetic field in a gap (6) defined by the magnetic arrangement (4). The gap (6) has two openings (7) enabling the passage of the thermal module (2) through the gap (6) by a relative movement between the magnetocaloric element (3) and the gap (6). The positions able to be taken by the magnetocaloric element (3), outside of the gap (6), define magnetocaloric region (8) in which the magnetocaloric region (8) is disposed in an enclosure delimited by the magnetic arrangement (4) comprising a body (11) forming deflector of the magnetic field able to capture and to lead towards the magnetic arrangement (4) flux of magnetic field that appears outside of the gap (6).

12 Claims, 8 Drawing Sheets

MAGNETOCALORIC THERMAL APPLIANCE

TECHNICAL SCOPE

The present invention relates to a magnetocaloric thermal appliance comprising at least one thermal module with at least one magnetocaloric element in contact with a heat transfer fluid and at least one magnetic arrangement arranged so as to create a magnetic field in a gap defined by said magnetic arrangement, in which said gap has at least one opening enabling the passage of said thermal module through said gap by a relative movement between said magnetocaloric element and said gap, where the positions able to be taken by said magnetic arrangement outside of said gap define magnetocaloric region, in which said magnetocaloric region is disposed in an enclosure delimited by said magnetic arrangement.

PRIOR TECHNIQUE

The technology of magnetic refrigeration at room temperature is known for more than twenty years and we know its advantages in terms of ecology and sustainable development. We also know its limitations in effective heat capacity and thermal efficiency. Therefore, research in this field tends to improve the performance of such a generator by acting on various parameters like the strength of the magnetic field, the performances of the magnetocaloric material, the heat exchange surface between the heat transfer fluid and the magnetocaloric materials, the performance of the heat exchangers, etc.

Concerning the magnetic field, the higher the magnetic field in the gap, the stronger the magnetocaloric effect of a magnetocaloric material disposed in this gap. To achieve in an economical way a strong magnetic field, of the order of 1.7 teslas in a magnetocaloric thermal appliance, it is known to realize a magnetic arrangement by using for example permanent magnets.

However another fact has to be taken in consideration in order to enhance the magnetocaloric effect. It concerns the difference of magnetic field in the region outside of the gap and close to the opening of this gap. The opening of the gap in which one or several magnetocaloric elements are allowed to circulate or to move alternately (or, conversely, the magnetic arrangement is able to move with respect to the fixed magnetocaloric elements) leads to a magnetic field leakage outside of the magnetic arrangement. This implies that the magnetocaloric elements do not pass from a zero magnetic field to a strong magnetic field when they enter the gap and vice-versa when they exit the gap, as it is desired. But they are subjected to a magnetic field when they stay near the gap, outside of the gap. Now, in this type of appliance, the difference of intensity of the magnetic fields, which the magnetocaloric elements are subjected to, must be as high as possible. In fact, the power of such an appliance is directly linked to the difference of magnetic intensity the magnetocaloric elements are subjected to. Therefore, the presence of a magnetic field in the magnetocaloric elements outside of the gap leads to a less high field difference and thus limits the efficiency of the magnetocaloric cycles and of the thermal appliance. For a same magnetic field variation, if the field leakages are not controlled, the magnetic arrangement to provide for a magnetocaloric thermal appliance would require more magnets, thus would be more expensive. Conversely, the suppression of the field leakages allows reducing the cost of the magnetic arrangement.

DESCRIPTION OF THE INVENTION

The present invention aims to overcome these disadvantages by proposing a magnetocaloric thermal appliance comprising a magnetic arrangement whose field outside of its gap is controlled so that magnetocaloric elements only undergo a magnetic field when they are inside of this gap. In other words, in said appliance, one or several magnetocaloric elements are subjected alternately to a high magnetic field in the gap defined by the magnetic arrangement and to a zero magnetic field outside of this gap. This change of magnetic field is very fast and can be done the displacement of the magnetic arrangement or of the magnetocaloric elements over a very short length.

To that purpose, the invention relates to a magnetocaloric thermal appliance comprising a body forming deflector of magnetic field able to capture and to lead towards the magnetic arrangement flux of magnetic field that appear outside of said gap.

The deflector allows redirecting the magnetic field flux towards the magnetic arrangement so that the field undergone by a magnetocaloric element is very weak or equal to zero in the region outside of the gap. The result of this is that the magnetic field difference undergone by a magnetocaloric element inside and outside of the gap is maximized, which allows increasing the magnetocaloric effect and thus the magnetocaloric efficiency of the thermal appliance.

According to one embodiment of the invention, said deflector can comprise at least one plate in a ferromagnetic material linked to the magnetic arrangement.

Advantageously, said plate can be inside a thermoplastic material overmolded on at least one portion of the magnetocaloric arrangement.

According to another embodiment of the invention, said deflector can comprise at least one component in a ferromagnetic material able to concentrate magnetic field leakages that appear in the magnetocaloric region and disposed in a space situated between two magnetocaloric elements of said thermal module.

Preferably, said enclosure delimited by said magnetic arrangement can have a volume that is higher than the volume of the magnetocaloric region and comprise at least one recess in which said deflector is disposed.

In that case, said deflector can extend in said recess from a region adjacent to the opening of the gap outside the magnetocaloric region and away from the magnetocaloric region.

In a first configuration, the magnetic arrangement can comprise at least a set of two magnetic poles facing each other for forming said gap and linked together at each side of the openings of the gap by a magnetic path returning system and said thermal module can comprise at least one magnetocaloric element and can be able to move in regard to the gap.

In a second configuration, the magnetic arrangement can comprise a rotational structure around a central axis associated with a magnetic return path ring, wherein said rotational structure has N magnetic extending poles defining N gaps with the magnetic return path ring, said magnetic poles being separated each from other by N volumes forming enclosures delimited by said magnetic arrangement and said thermal module can have an annular shape comprising magnetocaloric elements.

BRIEF DESCRIPTION OF THE DRAWINGS

The present invention and its advantages will be better revealed in the following description of embodiments given as non limiting examples, in reference to the drawings in appendix, in which.

ILLUSTRATIONS OF THE INVENTION

In the illustrated embodiments, identical parts carry the same numerical references.

Figure 1:
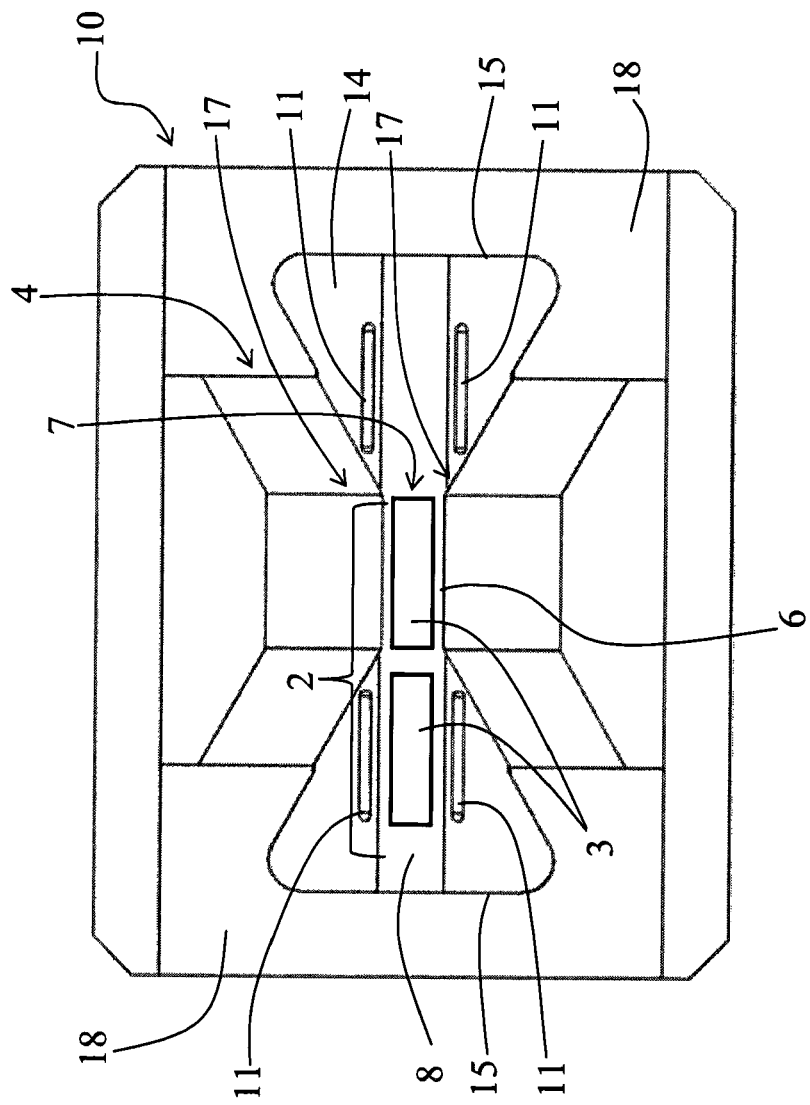
FIG. 1 is a simplified front view of a magnetocaloric thermal appliance according to the first embodiment, in a linear configuration of the invention.
Figure 2:
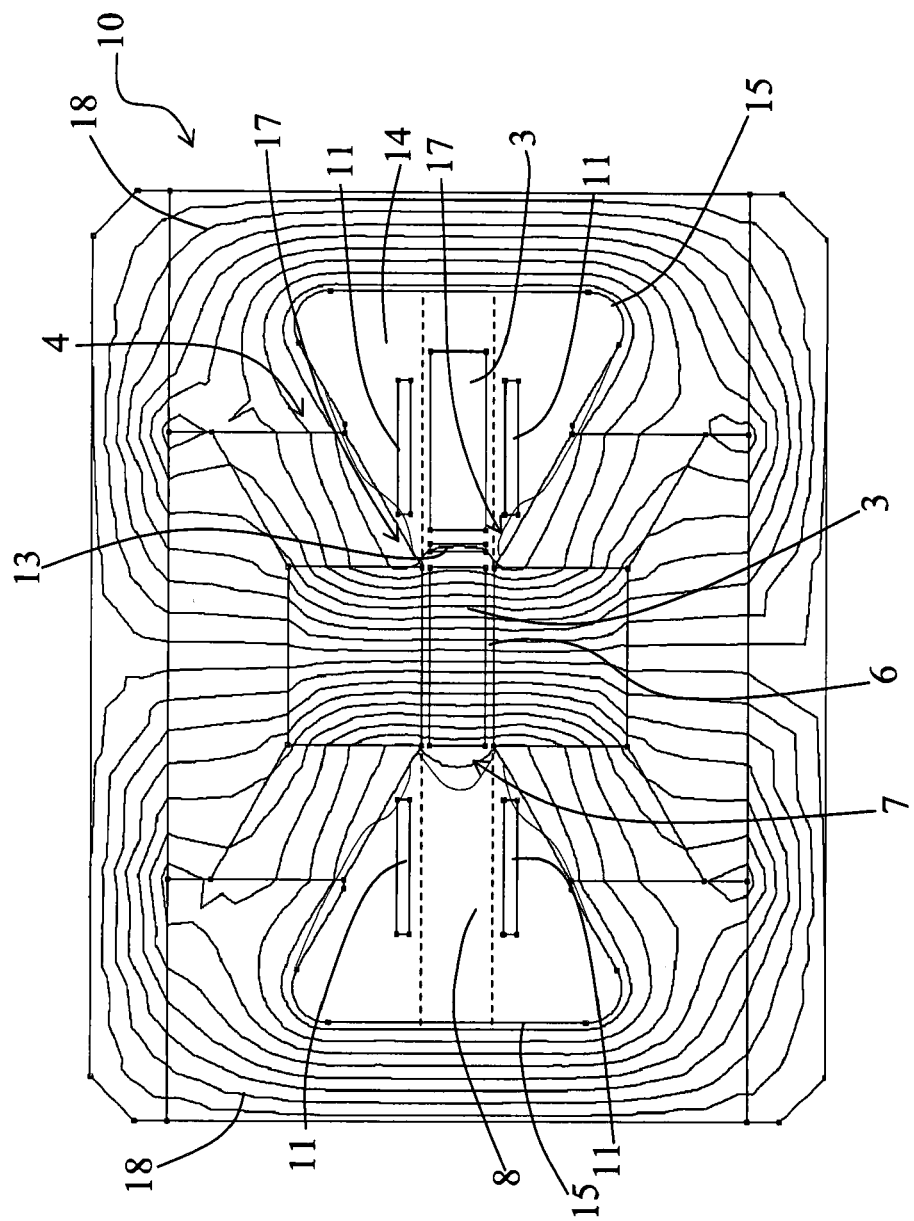
FIG. 2 is a view of the magnetic field generator of FIG. 1 showing the magnetic field flux.

FIGS. 1 and 2 represents an embodiment of a magnetocaloric thermal appliance 10 according to the invention. This appliance 10 comprises a magnetic arrangement 4 with two magnetic poles 17 forming a gap 6 in which a thermal module 2 containing two magnetocaloric elements 3 can move. The magnetic poles are linked together by a magnetic path returning system 18 realized by two C-shaped pieces in a ferromagnetic material. These both C-shaped pieces 18 define an enclosure delimited by the magnetic arrangement 4 and a recess 15 in which deflectors 11 in the form of flat plates are inserted in a thermoplastic material 14. These deflectors 11 are realized in ferromagnetic material and are disposed parallel to the magnetocaloric region 8 delimited by dotted lines in FIG. 2.

The thermal module 2 can move in relation to the gap 6 according to an alternative movement in two opposite directions so that each magnetocaloric element 3 can be introduced in this gap and removed from it alternately. FIGS. 1 and 2 show the two extreme positions that can be taken by the thermal module 2. Of course, the invention is not linked to the movement of the thermal module 2 in relation to the magnetic arrangement 4, which can also move in relation to one or more fixed thermal modules 2.

The operation of such an appliance consists in subjecting magnetocaloric elements 3 to a magnetic field variation while putting them in contact with a heat transfer fluid that circulates in a first direction through or along the magnetocaloric elements when they are in the gap 6 and in the opposite direction when they are outside of the gap 6. At a first phase of the magnetic cycle which corresponds to the phase where the magnetocaloric materials or elements 3 are subjected to a magnetic field, the temperature of the magnetocaloric elements 3 described increase and at the second phase where the magnetic field is equal to zero or very weak, the temperature of the magnetocaloric elements 3 decreases. For materials with inverse magnetocaloric effect, their temperature decreases when they are in a magnetic gap and their temperature increases when they are out of said gap. This appliance is intended to be linked thermally with one or several applications.

The thermal contact between the heat transfer fluid and the magnetocaloric elements can be realized by the fluid passing along or through the magnetocaloric materials. For this purpose, magnetocaloric elements can be constituted by one or more magnetocaloric materials and can be permeable to the heat transfer fluid. They can comprise fluid conducting passages extending between both ends of the magnetocaloric materials. These passages can be realized by the porosity of the magnetocaloric materials, or by channels machined or obtained by the assembly of plates of magnetocaloric material. Preferably, the heat transfer fluid is a liquid. For that purpose, it is possible to use pure water or water added with an antifreeze, a glycol product or a brine. The drawings in appendix do not illustrate the means allowing the displacement of the magnetocaloric elements and of the heat transfer fluid. To this purpose, pistons or another adapted mean can displace the heat transfer fluid. The magnetocaloric elements 6 can be mounted on a transversally movable carriage (not shown) or on any other suitable mean that can be moved.

As can be seen in FIG. 2, the deflectors with the shape of flat plates 11 aim to capture magnetic field flux that appear outside of the gap 6 and to lead them to the magnetic arrangement 4 so that, when a magnetocaloric element 3 is located outside of the gap 6, it undergoes a very weak or even no magnetic field.

According to a second embodiment of the invention, also displayed in FIG. 2, the thermal module 2 can also comprise a deflector 13 realized by a piece of ferromagnetic material interposed between two magnetocaloric elements 3 and able to concentrate magnetic field leakages that appear in the magnetocaloric region 8. In this way, it is ensured that the possible residual magnetic field flux or leakage in the magnetocaloric region 8 is captured and canalized by this piece forming deflector 13 so that when a magnetocaloric element 3 is located outside of the gap 6, it doesn't undergo any magnetic field. For that purpose, on the left hand side of FIG. 2, magnetic field flux extends in the magnetocaloric region 8 near the gap opening 7 while, on the opposite side, the magnetic field flux is concentrated in the deflector 13.

The deflectors 11, 13, according to the invention, ensure that the maximum difference of strength of magnetic field is undergone by each magnetocaloric material or element 3 between its positions inside and outside of the gap 6. In regard to an identical appliance that does not comprise any deflector, the efficiency of the applicant according to the invention is thus increased.

Figure 3:
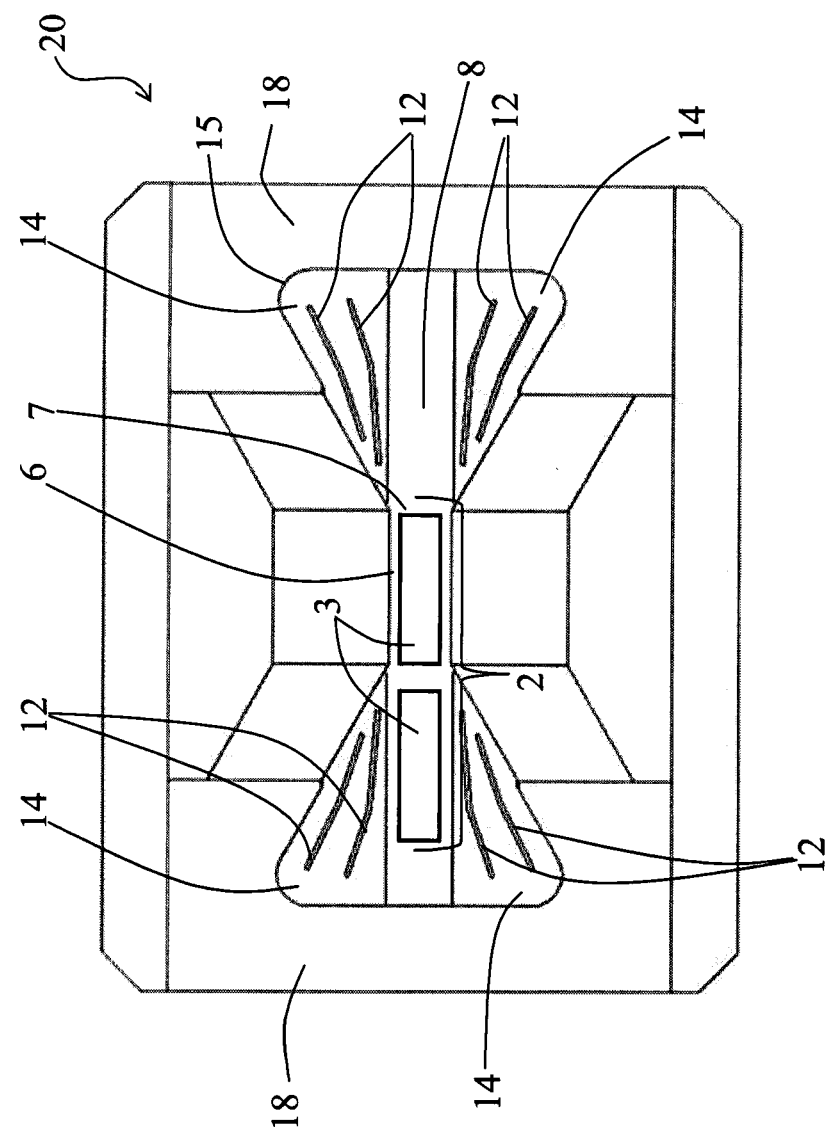
FIG. 3 is a simplified front view of a magnetocaloric thermal appliance according to a variant of the appliance of FIG. 1.
Figure 4:
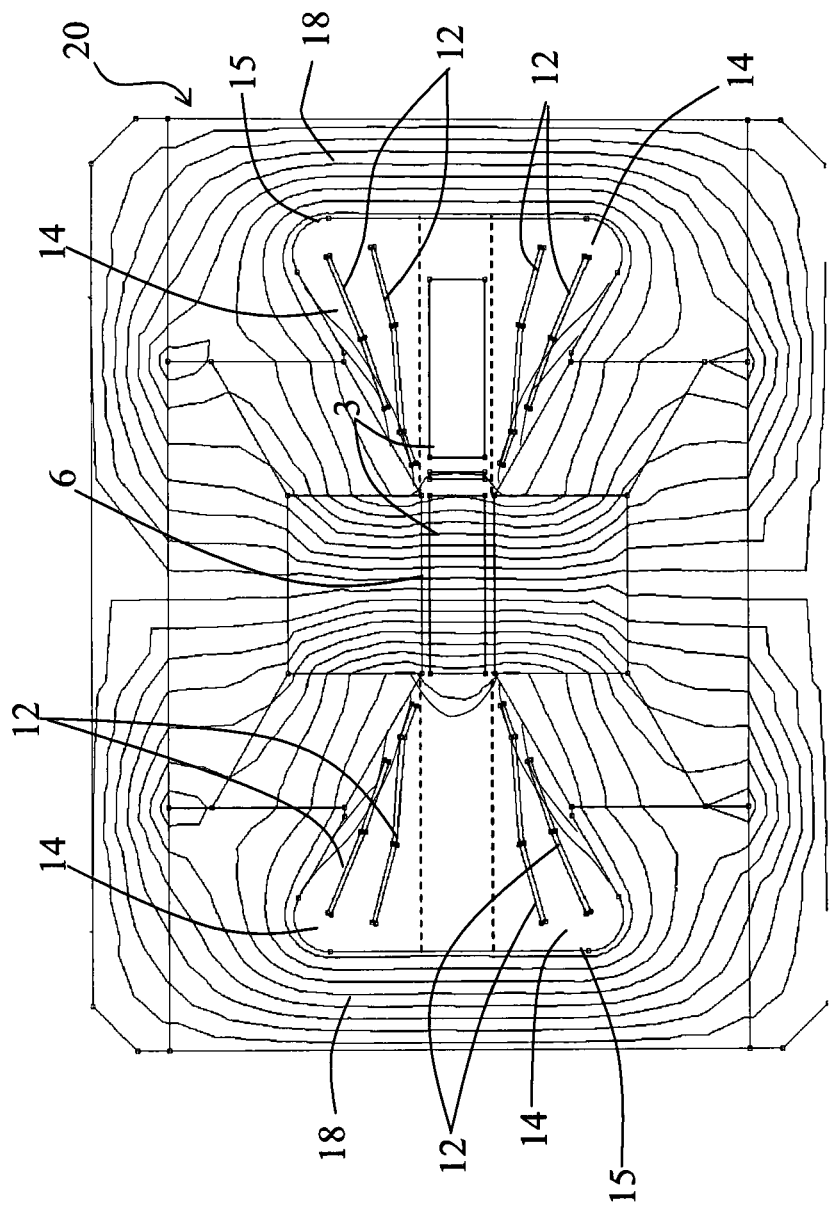
FIG. 4 is a view of the magnetic field generator of FIG. 3 showing the magnetic field flux.

FIGS. 3 and 4 are simplified views of a magnetocaloric thermal appliance 20 according to a variant of the appliance of FIGS. 1 and 2. The differences lie in the shape and in the number of the deflectors 12. Indeed, this appliance 20 comprises two curved deflectors 12 in each recess 15 formed by the C-shaped magnetic return path system 18. These deflectors 12 are localized outside of the magnetocaloric region 8 and extend from the area close to the opening 7 of the gap 6 to the back of the corresponding recess 15.

The same advantages as those previously described in connection with the appliance 10 of FIGS. 1 and 2 apply also to this appliance 20, so that the magnetocaloric element 3 in the magnetocaloric region 8 is submitted to a very weak, even to magnetic field equal to zero.

The invention is not linked to a specific number of deflector plates 11, 12, 13 that can vary from one to more than one according to the strength of the magnetic field, the size of the openings of the gap 6, the shape of the magnetocaloric elements 3, etc.

Figure 5:
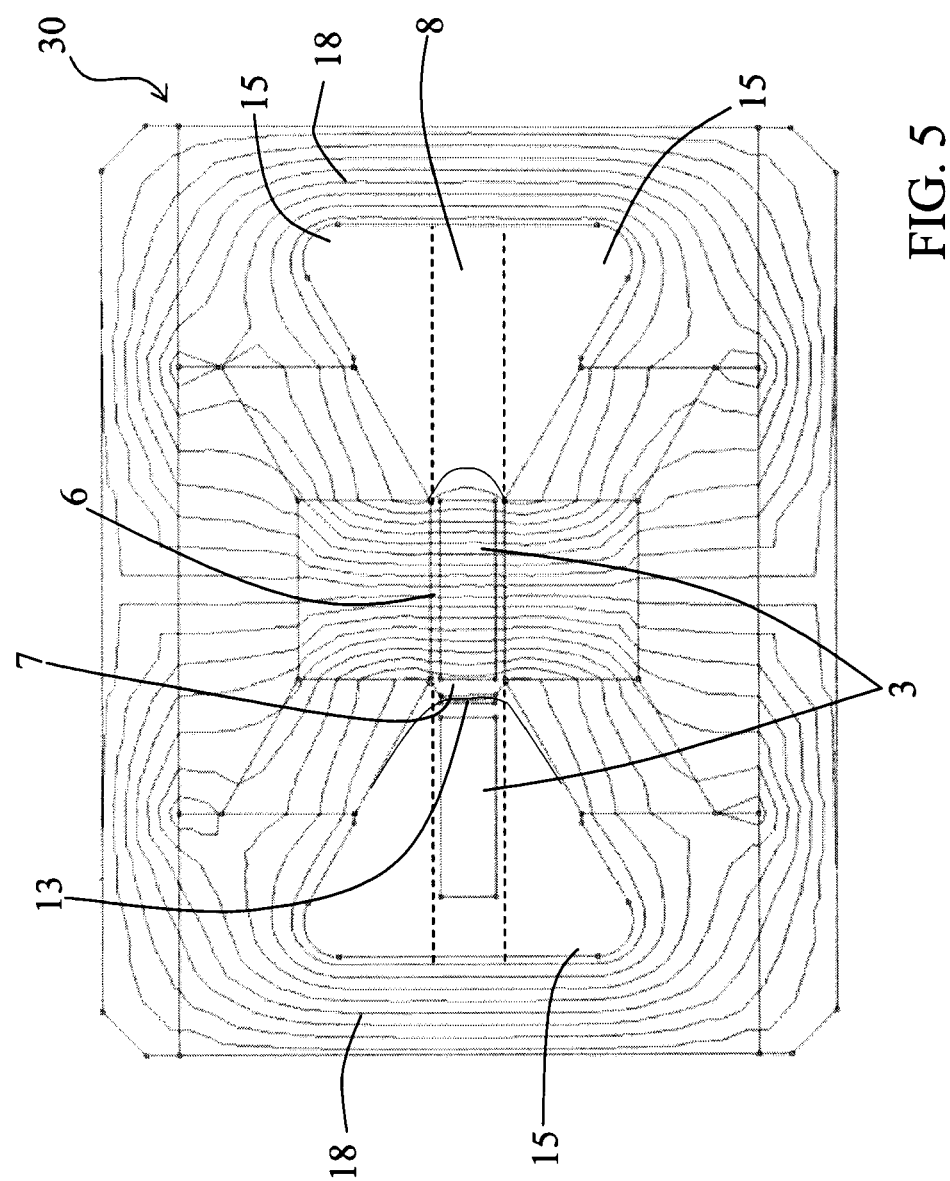
FIG. 5 is a simplified front view of a magnetocaloric thermal appliance according to the second embodiment, in a linear configuration of the invention, showing the magnetic field flux.
Figure 6:
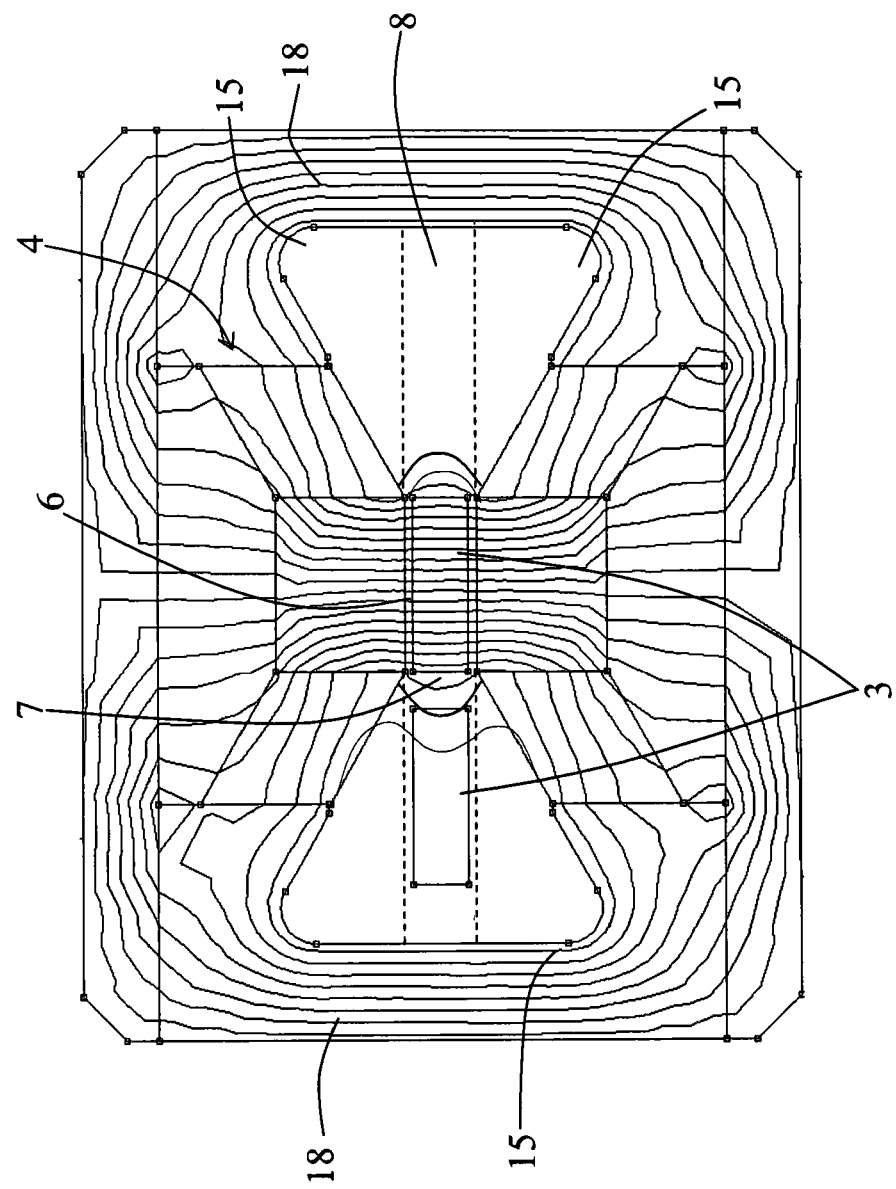
FIG. 6 represents the magnetic field flux of the appliance of FIG. 5 without its deflector.

The appliance 30 of FIG. 5 has the same configuration as the appliances 10 and 20 already described. However, it comprises only one deflector 13 between two adjacent magnetocaloric elements 3 in the thermal module 2, according to the second embodiment of the invention. When we compare the magnetic field flux in the vicinity of the gap opening 7 positioned at the left hand side of the FIGS. 5 and 6, we see that without this piece 13 of ferromagnetic material forming the deflector, some leakage flux subjects the magnetocaloric element 3 that is outside of the gap 6 to a magnetic field (see FIG. 6). The presence of the deflector 13 permits to canalize this magnetic flux and to deflect it from the magnetocaloric material 3 so that it has no influence on said magnetocaloric material (see FIG. 5).

Figure 7:
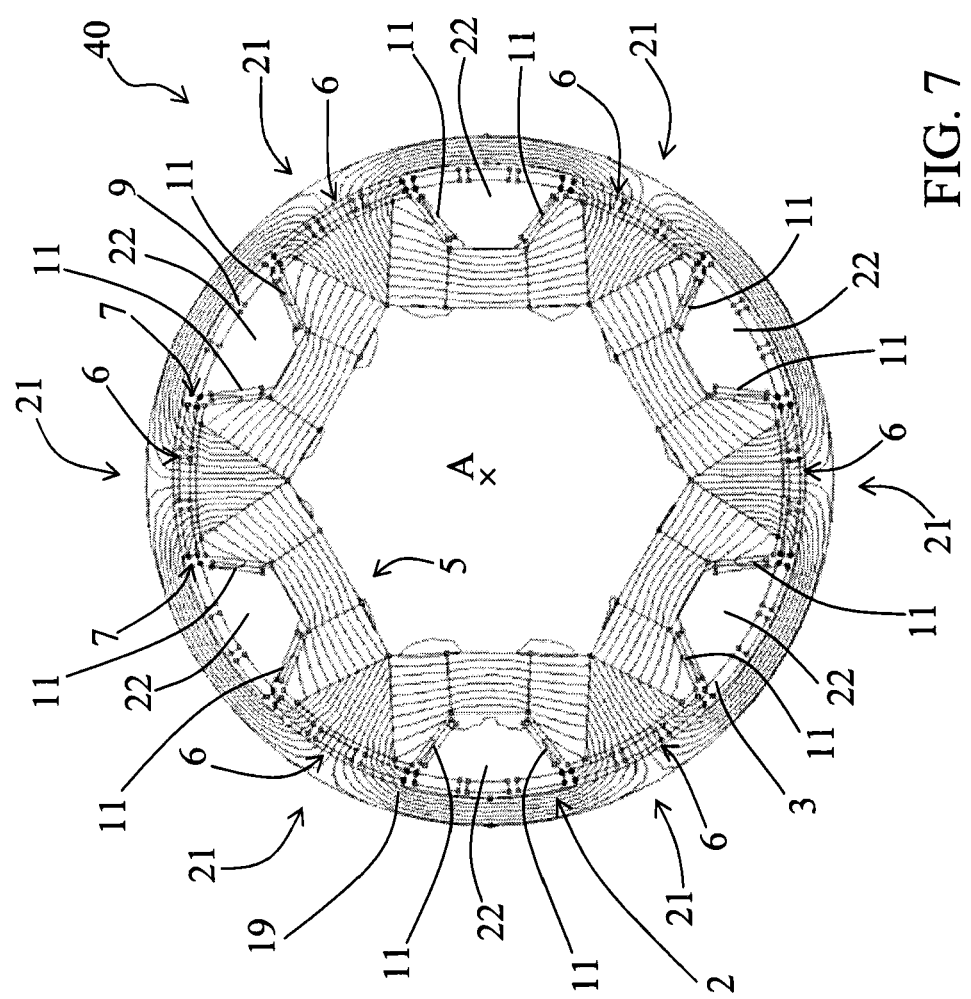
FIG. 7 is a simplified front view of a magnetocaloric thermal appliance according to the first embodiment, in a rotational configuration of the invention, showing the magnetic field flux.

FIG. 7 is a simplified view of a magnetocaloric thermal appliance 40 according to the first embodiment, in a rotational configuration. In this appliance 40, the magnetic arrangement 5 comprises a rotational structure around a central axis A associated with a magnetic return path ring 19. Said magnetic arrangement 5 comprises six magnetic extending poles 21 defining six gaps 6 with the magnetic return path ring 19. Six volumes 22 separating the magnetic poles 21 form the enclosure delimited by said magnetic arrangement 5. In this configuration, the thermal module 2 has a ring or annular shape that comprises magnetocaloric elements 3 and the magnetocaloric region 9 corresponds to portions of that ring that are outside of the gaps 6. Two linear plates 11 forming magnetic field flux deflectors are positioned in each volume 22 so that a deflector 11 is assigned to the opening 7 of each gap 6.

Figure 8:
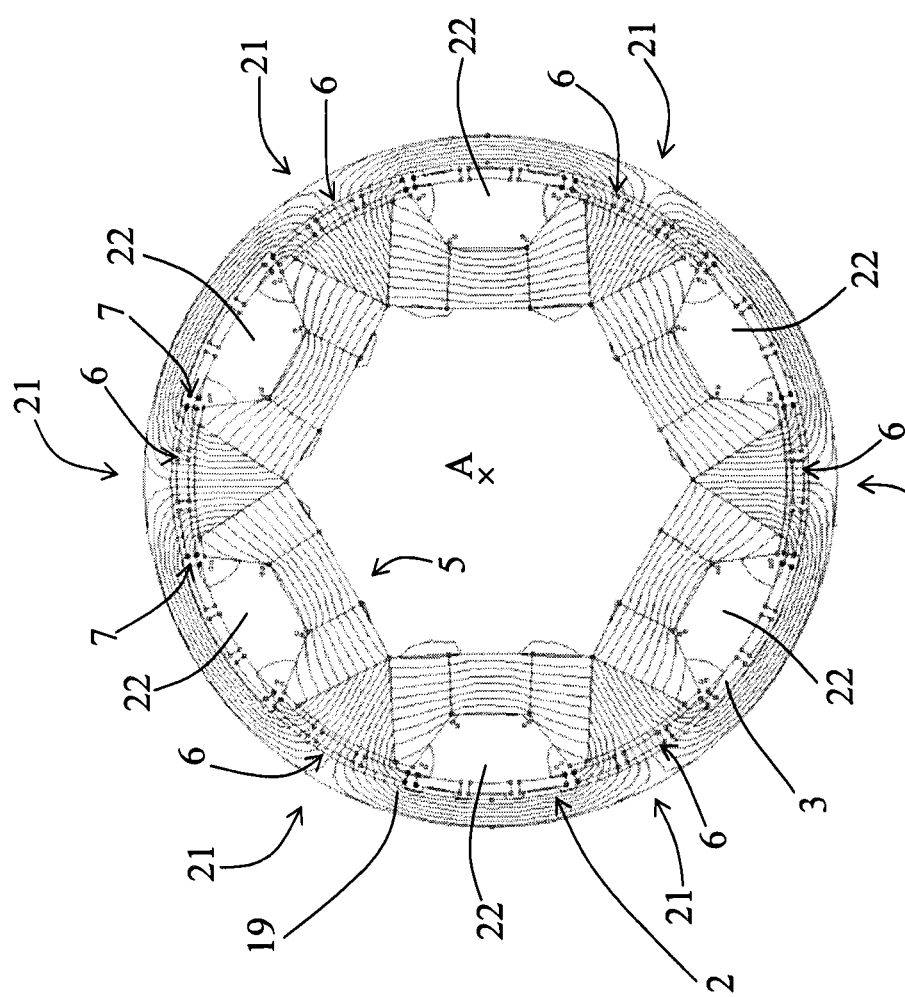
FIG. 8 represents the magnetic field flux of the appliance of FIG. 7 without its deflector.

FIG. 8 shows the appliance of FIG. 7 without its deflectors 11. The comparison of the magnetic flux of both FIGS. 6 and 7 clearly show that the deflectors permit to canalize the magnetic field flux appearing in the magnetocaloric region 9. The same advantages as those in regard to the appliances 10 and 20 apply here for this appliance 40.

Thanks to the invention, the magnetic field difference in magnetocaloric elements 3 between their position in the gap 6 and their position in the magnetocaloric region 8, 9 is thus increased, which allows optimizing the efficiency of the magnetocaloric thermal appliance 10, 20, 30, 40.

As an example, in a magnetocaloric thermal appliance 10 like this represented in FIG. 2, the magnetic field difference between the magnetocaloric region 8 and the gap 6 is equal to 1.7 (inside the gap)−0.3 (in the vicinity of the gap opening, outside of the gap)=1.4 teslas when there is no deflector, while it is equal to (rounded up to the hundredth) 1.7−0.0019=1.7 teslas in presence of the deflectors 11, 12, 13. Now, the higher the magnetic field difference, the higher the magnetocaloric effect in the magnetocaloric elements 3. The magnetocaloric thermal appliance 10, 20, 30, 40 according to the invention allows improving efficacy and efficiency.

Another advantage related to the implementation of deflectors 11, 12, 13 in appliances 10, 20, 30, 40 according to the invention relies in the fact that it permits to reduce the size of the enclosure delimited by the magnetic arrangement 4, 5 in which the magnetocaloric elements 3 are placed when they are outside of the gap 6. Indeed, since the magnetic field decreases when going away from the opening 7 of the gap 6, without the presence of the deflectors according to the invention and in order to subject a magnetocaloric element 3 to a magnetic field difference of 1.7 teslas, it would be necessary to move it more than 100 millimeters away from the opening 7 of the gap 6. This movement would require more space between the magnetocaloric elements 3 and high mechanical efforts due to the permeability of the magnetocaloric material. The additional energy to be supplied would therefore reduce the efficiency of the magnetocaloric thermal appliance.

Moreover, the presence of a deflector 13 between two consecutive magnetocaloric elements 3 permits to create a continuous magnetic flux inside the thermal module 2 that permits to reduce the energy necessary for the relative displacement of the magnetocaloric material in regard to the magnetic arrangement 4, 5 (inside and outside of the gap 3). Thus, less mechanical power is useful for moving the magnetocaloric elements 3 and the efficiency of the appliance is increased.

The deflectors according to the invention thus permit to increase the efficiency of an appliance by obtaining a maximal magnetic field in a magnetocaloric material 3 between its positions in the gap 6 and outside of this gap 6 while optimizing the size of this appliance 10, 20, 30, 40.

Consequently, the efficiency of such a magnetocaloric thermal appliance is higher than that of the known appliances.

POSSIBILITIES FOR INDUSTRIAL APPLICATION

This description shows clearly that the invention allows reaching the goals defined, that is to say to offer a magnetocaloric thermal appliance whose efficiency is optimized thanks to the achievement of a higher magnetic field difference undergone by a magnetocaloric element 3 between the outside zone of the gap 6 and the gap 6 obtained by canalizing and deflecting the magnetic field flux appearing outside of the gap 6.

This magnetocaloric thermal appliance can find an application in the area of heating, air conditioning, tempering, cooling or others, at competitive costs and with reduced space requirements.

The present invention is not restricted to the examples of embodiment described, but extends to any modification or variant which is obvious to a person skilled in the art while remaining within the scope of the protection defined in the attached claims.

The invention claimed is:

1. A magnetocaloric thermal appliance (10, 20, 30, 40) comprising:
    at least one thermal module (2) with a first and a second magnetocaloric elements (3) in contact with a heat transfer fluid;
    at least one magnetic arrangement (4, 5) arranged so as to create a magnetic field in a gap (6);
    the gap (6) being defined by the magnetic arrangement (4, 5);
    the gap having at least one opening (7) enabling the passage of the thermal module (2) through the gap (6) by relative movement between the first and the second magnetocaloric elements (3) and the gap (6);
    the first magnetocaloric element (3) being movable to a position located inside the gap (6) where the first magnetocaloric element (3) is subjected to a magnetic field while the second magnetocaloric element (3) being located outside of the gap (6) where the second magnetocaloric element (3) experiences substantially zero magnetic flux;

the second magnetocaloric element (3) being movable to a position located inside the gap (6) where the second magnetocaloric element (3) is subjected to a magnetic field, while the first magnetocaloric element (3) being located outside of the gap (6) where the second magnetocaloric element (3) experiences substantially zero magnetic flux; and the outside of the gap (6) defining a magnetocaloric region (8, 9) which is disposed in an enclosure delimited by the magnetic arrangement (4, 5);

wherein the magnetocaloric thermal appliance (10, 20, 30, 40) comprises a recess (15), located inside the enclosure;

an additional body (11, 12, 13) is inserted in the recess (15), outside the gap and adjacent the opening (7) to form a magnetic field deflector;

the magnetic field deflector comprises at least one plate (11, 12) of a ferromagnetic material fixedly and directly linked to the magnetic arrangement (4, 5);

the magnetic field deflector capturing a flux which appears outside of the gap (6) in the magnetocaloric region (8, 9);

the magnetic field deflector redirecting the flux back toward the magnetic arrangement (4, 5) inside the gap (6) so that the field experienced by one of the first and the second magnetocaloric elements (3), located in the magnetocaloric region outside of the gap, is very weak or equal to zero.

2. The magnetocaloric thermal appliance according to claim 1, wherein the deflector comprises the at least one plate (11, 12) of the ferromagnetic material which is linked to the magnetic arrangement (4, 5) such that for each magnet of the magnetic arrangement (4, 5) there is at least one plate; and a first end of the at least one plate (11, 12) is located adjacent to the opening (7) of the gap (6), and a second end of the at least one plate (11, 12) inside the recess (15) is furthest from the opening (7) of the gap (6).

3. The magnetocaloric thermal appliance according to claim 1, wherein the deflector comprises a first plate and a second plate (11, 12) and each plate is located inside a thermoplastic material (14) overmolded on at least one portion of the magnetocaloric arrangement (4, 5), the first and the second plates are located opposite one another in the recess, and the first and the second plates each having a first end located adjacent respective opposing sides of the opening (7) of the gap (6).

4. The magnetocaloric thermal appliance according to claim 1, wherein the at least one thermal module (2) comprises at least third and fourth magnetocaloric elements (3);

the deflector comprises at least one component (13) of a ferromagnetic material able to concentrate magnetic field leakages that appear in the magnetocaloric region (8, 9); and the deflector is disposed adjacent the opening of the gap such that the deflector is situated between one of the first and the second magnetocaloric elements (3) which is located inside the gap (6), and the other of the first and the second magnetocaloric elements (3) which is located outside of the gap (6).

5. The magnetocaloric thermal appliance according to claim 1, wherein the enclosure delimited by the magnetic arrangement (3) has a volume that is greater than a volume of the magnetocaloric region (8, 9) and comprises the recess (15) in which the deflector (11, 12) is disposed;

a magnetic return path ring (19) radially surrounds an annular arrangement of the at least one first and second magnetocaloric elements (3) and the at least one magnetic arrangement (4, 5);

the gap (6) is located radially between an outwardly radial facing surface of the magnetic arrangement (4, 5) and an inwardly facing radial surface of the magnetic return path ring (19), and the recess (15) is located between the magnetic arrangement (4, 5) and the magnetic return path ring (19).

6. The magnetocaloric thermal appliance according to claim 1, wherein a first end of the deflector (11, 12) is located adjacent the opening (7) of the gap and a second end of the deflector (11, 12) is located remote from the opening (7) of the gap so that the deflector (11, 12) extends in the recess (15) from a region adjacent to the opening (7) of the gap (6), from outside the magnetocaloric region (8, 9) and away from the magnetocaloric region (8, 9).

7. The magnetocaloric thermal appliance according to claim 1, wherein the magnetic arrangement (4) comprises at least a set of two magnetic poles (17) facing each other and forming the gap (6) and linked together at each side of the openings (7) of the gap by a magnetic path returning system (18), and the at least one plate (11, 12) of a ferromagnetic material is linked to the magnetic arrangement (4, 5) such that, for each magnet of the magnetic arrangement (4), there is an associated at least one plate (11, 12).

8. The magnetocaloric thermal appliance according to claim 1, wherein the magnetic arrangement (5) comprises:
a rotational structure around a central axis (A) associated with a magnetic return path ring (19);

the rotational structure has a plurality of magnetic extending poles (21) defining a plurality of gaps (6) with the magnetic return path ring (19);

the plurality of magnetic poles (21) are separated each from other by a plurality of volumes (22) forming enclosures, each having a pair of fixed magnetic field deflector plates adjacent a respective opening in each of the plurality of gaps (6), delimited by the magnetic arrangement (5); and the thermal module (2) has an annular shape comprising a plurality of magnetocaloric elements (3).

9. A magnetocaloric thermal appliance (10, 20, 30, 40) comprising:

at least one thermal module (2) having at least one magnetocaloric element (3) in contact with a heat transfer fluid;

at least one magnetic arrangement (4, 5), having at least first and second magnets, arranged so as to create a magnetic field in a gap (6) bounded by the magnetic arrangement (4, 5) respectively;

the gap (6) of the at least one magnetic arrangement (4, 5) having at least one opening (7) enabling passage of the at least one thermal module (2) into and out of the gap (6) of the at least one magnetic arrangement (4, 5), by relative movement between the magnetocaloric element (3) and the gap (6);

the at least one rotatable thermal module (2) facilitating movement of the magnetocaloric element (3) to at least one position located inside the gap (6) and to at least one position located outside of the gap (6);

the outside of the gap (6) defining a magnetocaloric region (8, 9) that is disposed in an enclosure delimited by the magnetic arrangement (4, 5);

a recess (15), located inside the enclosure and thus outside the gap, is delimited on first and second sides by the first and the second magnets of the magnetic arrangement (4, 5) respectively;

an additional magnetic field deflector body (11, 12, 13) having first and second plates being located outside the gap and inserted in the recess, and fixedly supported by the at least one magnetic arrangement (4, 5);

the additional body (11, 12, 13), having the first and the second plates, being fixedly positioned with respect to the first and the second magnets of the magnetic arrangement (4, 5) respectively;

the first and the second plates arranged to form a magnetic field deflector which is able to capture and direct a magnetic field flux, produced by the first and the second magnets of the magnetic arrangement (4,5), that appears in the enclosure and outside the gap (6) back towards the first and the second magnets of the magnetic arrangement (4, 5) such that the at least one magnetocaloric element (3) experiences substantially zero magnetic flux, when located within the magnetocaloric region (8, 9) and being subjected to a magnetic field when located within the gap (6); and the first and the second plates of the magnetic field deflector are spaced from the first and the second magnets of the magnetic arrangement and are arranged between the magnetocaloric region and the first and the second magnets of the magnetic arrangement respectively, such that the recess (15) is sandwiched on opposing first and second sides by the first and second plates respectively, the first and second sides being located adjacent opposing sides of the opening (7) of the gap (6).

10. The magnetocaloric thermal appliance according to claim 9, wherein the recess (15) is bounded, on a third side, by the first magnetic arrangement (4, 5), and is bounded, on a fourth side, by the formation of the opening (7) to the gap (6); and the first and the second plate being located opposite one another in the recess, and the first and the second plate each having a first end located adjacent opposing sides of the opening (7) of the gap (6).

11. The magnetocaloric thermal appliance according to claim 9, wherein the recess (15) is bounded by a concave portion of the magnetic arrangement (4, 5) and for each magnet of the at least one magnetic arrangement (4, 5) there is at least one associated plate of the additional body and the at least one magnetic arrangement (4, 5) is fixed.

12. The magnetocaloric thermal appliance according to claim 9, wherein the recess (15) is bounded by a radially exterior concave portion of the magnetic arrangement (4, 5).

* * * * *